(12) United States Patent
Nishi

(10) Patent No.: US 6,981,514 B2
(45) Date of Patent: Jan. 3, 2006

(54) FUEL CUTOFF VALVE

(75) Inventor: Hiroshi Nishi, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/800,718

(22) Filed: Mar. 16, 2004

(65) Prior Publication Data

US 2004/0187923 A1   Sep. 30, 2004

(30) Foreign Application Priority Data

Mar. 25, 2003   (JP) .............................. 2003-082931

(51) Int. Cl.
*F16K 24/04*   (2006.01)
(52) U.S. Cl. ........................................ 137/202; 137/43
(58) Field of Classification Search .................. 137/43, 137/202
See application file for complete search history.

(56) References Cited

U.S. PATENT DOCUMENTS 4,905,726 A * 3/1990 Kasugai et al. ............. 137/202
5,443,561 A   8/1995 Sakata et al.
6,591,855 B2 * 7/2003 Nishi et al. ................. 137/202

FOREIGN PATENT DOCUMENTS

JP        A-6-297968        10/1994

* cited by examiner

*Primary Examiner*—Gerald A. Michalsky
(74) *Attorney, Agent, or Firm*—Posz Law Group, PLC

(57) ABSTRACT

A fuel cutoff valve has a casing main body, a first float having a smaller specific gravity than a fuel, a second float having a greater specific gravity than the fuel, and a spring. The first float has a float main body and a buoyancy body of a foamed resin. The first float's specific gravity therefore is smaller than the fuel's specific gravity. The first float rises by buoyancy to close a first connection conduit, when a liquid level in a fuel tank exceeds a first liquid level. The second float rises by buoyancy and pressing of the spring to close a second connection conduit, when the liquid level exceeds a second liquid level, higher than the first liquid level. The second float lowers to open the second connection conduit, when the liquid level becomes lower than the second liquid level but is still higher than the first liquid level.

12 Claims, 8 Drawing Sheets

FUEL CUTOFF VALVE

This application claims the benefit of priority from Japanese Application No. 2003-82931 filed Mar. 25, 2003, the content of which is incorporated herein by reference.

BACKGROUND OF THE INVENTION

1. Field of the Invention

The present invention relates to a fuel cutoff valve that is attached to a top end of a fuel tank and functions to connect and disconnect the fuel tank with and from outside according to the liquid level in the fuel tank.

2. Description of the Related Art

A known fuel cutoff valve is disclosed, for example, in JP No. 6-297968A. This prior art fuel cutoff valve has a casing with a connection conduit connected to outside of a fuel tank, a cylindrical first float valve arranged in a valve chamber in the casing, a second float valve arranged in a vertically movable manner in a storage chamber of the first float valve, and a spring supporting these elements. The first float valve closes the connection conduit when a liquid level in the fuel tank exceeds a preset first liquid level. The second float valve closes the connection conduit when the liquid level in the fuel tank exceeds a preset second liquid level. This prevents leakage of fuel from the fuel tank to a canister during a fuel supply or in a vehicle rocking attitude.

In this prior art fuel cutoff valve, the spring functions to move up and down the first float valve and the second float valve, which are composed of a material having a greater specific gravity than that of the fuel. The movement of the float valve can thus not follow the rise speed of the liquid level in the fuel tank. Namely the prior art fuel cutoff valve can not quickly close to prevent leakage of the fuel from the fuel tank under a large transverse force or under a large upthrust force, which may arise during a turn of the vehicle.

SUMMARY OF THE INVENTION

The object of the present invention is thus to provide a fuel cutoff valve that quickly closes and effectively prevents leakage of fuel from a fuel tank even under a large transverse force, for example, at the time of a turn of a vehicle, or under a large upthrust force.

In order to attain at least part of the above and the other related objects, the present invention is directed to a fuel cutoff valve that is attached to an upper wall of a fuel tank, and works by a liquid level in the fuel tank The fuel cutoff valve comprises a casing including (i) a casing main body having a valve chamber connected to the fuel tank, (ii) an external conduit located outside the fuel tank, and (iii) a first connection conduit formed in an upper portion of the casing main body to connect the external conduit with the valve chamber, a first float including (i) a float main body accommodated in the valve chamber, being capable of moving up and down, the float main body having (i-a) a bottom-open storage chamber, and (i-b) a second connection conduit to connect the first connection conduit and the storage chamber, an area of the second connection conduit being smaller than that of the first connection conduit, and (iii) a buoyancy body coupled with the float main body and making a resulting specific gravity of the buoyancy body and the float main body smaller than a specific gravity of a fuel; a second float accommodated in the storage chamber, being capable of moving up and down according the liquid level in the fuel tank to open and close the second connection conduit, a specific gravity of the second float being greater than that of the fuel, and; a spring for pressing the second float toward the second connection conduit.

The first float is constructed to move up by buoyancy and thereby close the first connection conduit when the liquid lever exceeds a first liquid level. The second float is constructed to move up by buoyancy and a pressing force of the spring and thereby close the second connection conduit when the liquid level exceeds a second liquid level higher than the first liquid level, and to move down to open the second connection conduit when the level drops below the second liquid level but is still above the first liquid level.

While the liquid level in the fuel tank is lower than the preset first liquid level in the course of fuel supply, the fuel cutoff valve of the invention connects with outside (a canister) to release the fuel vapor out of the fuel tank. When the liquid level in the fuel tank exceeds the preset first liquid level, the first float moves up and closes the first connection conduit. The inner pressure of the fuel tank then temporarily rises to prompt an auto stop of a fuel feed gun. This arrangement effectively prevents leakage of the fuel from the fuel tank to the outside.

In this state, the second connection conduit having the smaller flow path area than that of the first connection conduit is kept open to hold connection of the fuel tank with the outside. The connection with the external air adjusts the inner pressure of the fuel tank, as the inner pressure of the fuel tank rises or drops in the closed position of the first float. When the liquid level in the fuel tank exceeds the preset second liquid level, which is higher than the preset first liquid level, for example, in a vehicle rolling attitude or in a vehicle tilting attitude, the second float moves up to close the second connection conduit.

In the fuel cutoff valve of the invention, the buoyancy body makes the resulting specific gravity of the first float significantly smaller than the specific gravity of the fuel. In the case of an abrupt rise of the liquid level in the fuel tank, for example, in the state of liquid level fluctuation during a turn of the vehicle, the movement of the first float well follows the rise speed of the liquid level and quickly blocks the first connection conduit.

The second float has the greater specific gravity than that of the fuel. The second float is thus immediately separated from the first float when the liquid level becomes lower the preset second liquid level. This quickly cancels the pressure difference between the inside and the outside of the fuel tank. This arrangement effectively prevents the lightweight first float from adhering to the seat of the first connection conduit and ensures the excellent valve re-opening properties.

In the vehicle rolling attitude and the vehicle turnover attitude, the second float having the large specific gravity presses against and sinks the first float to block both the first connection conduit and the second connection conduit. This arrangement effectively prevents leakage of the fuel from the fuel tank.

These and other objects, features, aspects, and advantages of the present invention will become more apparent from the following detailed description of the preferred embodiment with the accompanying drawings.

DESCRIPTION OF THE PREFERRED EMBODIMENTS (1) General Structure of Fuel Cutoff Valve 20

Figure 1:
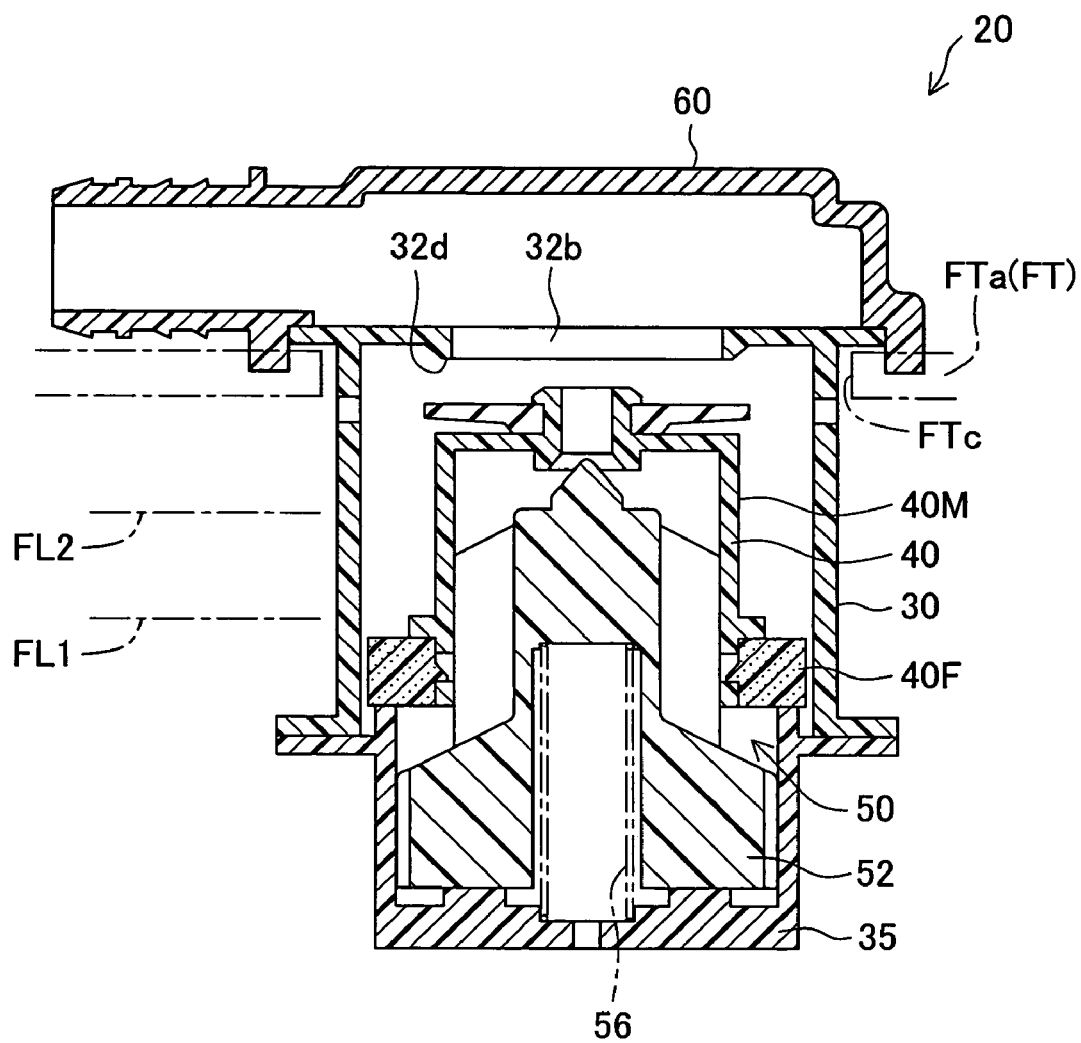
FIG. 1 is a sectional view showing a fuel cutoff valve attached to an upper wall of a fuel tank FT of a vehicle in one embodiment of the invention.

FIG. 1 is a sectional view showing a fuel cutoff valve 20 attached to an upper wall of a fuel tank FT of a vehicle in one embodiment of the invention. The surface of the fuel tank FT is made of a composite resin material containing polyethylene. An attachment hole FTc is formed in a tank upper wall FTa of the fuel tank FT. The lower portion of the fuel cutoff valve 20 is inserted into the attachment hole FTc, so that the fuel cutoff valve 20 is fixed to the tank upper wall FTa.

The fuel cutoff valve 20 works to prevent an outflow of fuel to outside (a canister), when the liquid level in the fuel tank FT rises to a preset liquid level, for example, in the course of fuel feed. There are two preset liquid levels, a first liquid level FL1 that represents a full level of fuel supply and a second liquid level FL2 that is higher than the first liquid level FL1 and is set to prevent leakage of fuel in a tilted attitude of the vehicle. The description below regards the structure and the operations of the respective elements of the fuel cutoff valve 20.

(2) Structure of Elements

Figure 2:
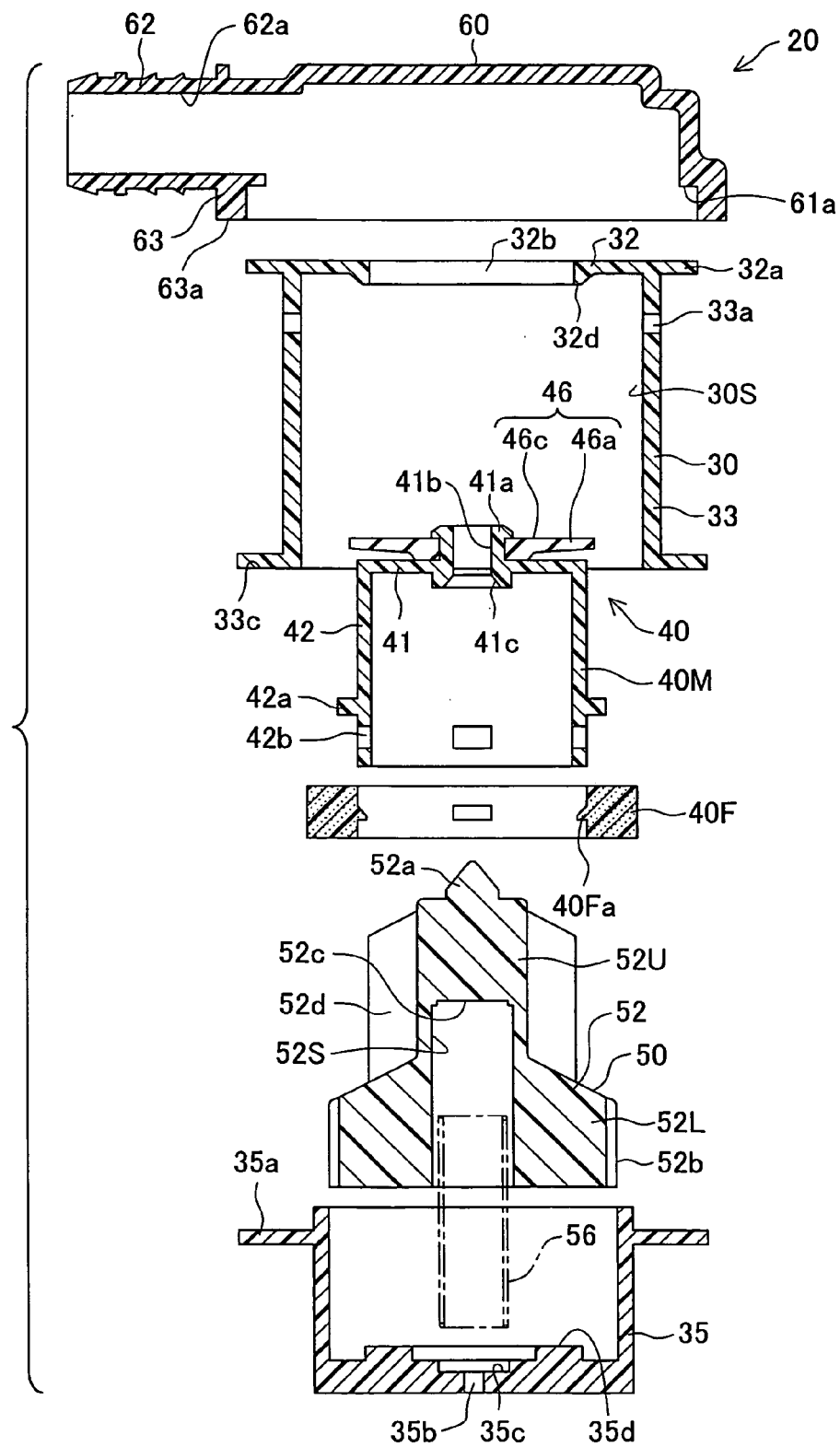
FIG. 2 is a decomposed sectional view of the fuel cutoff valve.

The fuel cutoff valve 20 has a casing main body 30, a lower casing 35, a first float 40, a second float 52 defining a rollover valve 50, a spring 56, and a cover 60 as its primary constituents. The casing main body 30, the lower casing 35, and the second float 52 are made of polyacetal, which is a synthetic resin having excellent fuel oil resistance. FIG. 2 is a decomposed sectional view of the fuel cutoff valve 20.

(2)-1 Casing Main Body 30

The casing main body 30 has a top wall 32 with a flange 32a and a cylindrical side wall 33 extended downward from the top wall 32. The top wall 32 and the side wall 33 define a cup-shaped valve chamber 30S, which has a bottom opening 30a. A first connection conduit 32b passes through the center portion of the top wall 32. The circumference of the first connection conduit 32b facing the valve chamber 30S forms a first seat 32d.

A first connection hole 33a is formed in an upper portion of the side wall 33. The first connection hole 33a is located above the first float 40 when the first float 40 is set in its lower position, as shown in FIG. 1. This arrangement prevents the first float 40 from moving up by the air current flown through the first connection hole 33a. A flange 33c is formed at the bottom of the side wall 33. The flange 33c is used for welding to the lower casing 35 as discussed later.

(2)-2 Lower Casing 35

The lower casing 35 is a member used to close the bottom opening 30a of the casing main body 30, and has a flange 35a on the outer circumference thereof. The flange 33c is welded to the flange 35a by heat or by ultrasonic wave, so that the lower casing 35 is integrated with the casing main body 30 and closes the bottom opening 30a of the casing main body 30. A second connection hole 35b is formed in the center portion of the lower casing 35. The second connection hole 35b connects with the valve chamber 30S and introduces an inflow of fuel into the valve chamber 30S. A cylindrical spring support recess 35c is formed on the center portion of the upper face of the lower casing 35. The spring 56 is spanned between the spring support recess 35c and a spring support recess 52c of the second float 52 (discussed later). A ring-shaped seat 35d is formed around the outer circumference of the spring support recess 35c to receive the second float 52 seated thereon.

(2)-3 First Float 40

The first float 40 has a cup-shaped float main body 40M made of polyacetal and having a top wall 41 and a cylindrical side wall 42, which is extended downward from the outer circumference of the top wall 41, a buoyancy body 40F attached to the lower portion of the float main body 40M, and a rubber valve body 46 attached to the top of the float main body 40M. The hollow space of the float main body 40M defines a storage chamber 40S to receive the upper portion of the second float 52 therein. A connection pipe 41a is protruded from the center portion of the top wall 41. The connection pipe 41a forms a second connection conduit 41b and has a seat surface 41c on its lower end. The second connection conduit 41b connects the storage chamber 40S with the first connection conduit 32b.

The buoyancy body 40F is a ring-shaped member having a smaller specific gravity than that of the fuel. The buoyancy body 40F has an attachment projection 40Fa formed on the inner circumference thereof. The attachment projection 40Fa is fit in an attachment hole 42b formed in the side wall 42 and the upper surface of the buoyancy body 40F is supported by a detent 42a. The buoyancy body 40F is accordingly positioned relative to and attached to the lower portion of the float main body 40M. The buoyancy body 40F is a lightweight, closed-cell foamed resin member of butadiene acrylonitrile copolymer (NBR). The buoyancy body 40F makes the total specific gravity of the first float 40 including the float main body 40M, buoyancy body 40F and the rubber valve body 46 is set to be smaller than the specific gravity of the fuel. For example, the float main body 40M has a specific gravity of 1.2 to 1.4, and the buoyancy body 40F has a specific gravity of 0.2 to 0.5. The total specific gravity of the first float 40 is in a range of 0.5 to 0.7.

The rubber valve body 46 is set outside of the connection pipe 41a of the top wall 41. The rubber valve body 46 is made of a rubber material and has a disc-shaped seat element 46a. The upper face of the rubber valve body 46 forms a seat 46c, which is seated on and separated from the first seat 32d with lifting up and down movements of the first float 40.

(2)-4 Second Float 52

The second float 52 has a small-diameter portion 52U and a large-diameter portion 52L, which is integral with the lower end of the small-diameter portion 52U and has an expanded diameter. A seal projection 52a is formed on the top portion of the small-diameter portion 52U. An open buoyancy chamber 52S is located in the lower portion of the small-diameter portion 52U. Guide projections 52d are formed on the outer circumference of the small-diameter portion 52U to be guided by the inner wall of the float main body 40M. Guide projections 52b are formed on the outer circumference of the large-diameter portion 52L to be guided by the inner wall of the lower casing 35. These guide projections 52d and 52b allow the second float 52 to move in the vertical direction. The spring support recess 52c is formed above the buoyancy chamber 52S to support the upper end of the spring 56. The second float 52 is accordingly supported by the lower casing 35. The second float 52 is made of polyacetal having the greater specific gravity than that of the fuel.

(2)-5 Cover 60

The cover 60 has a cover main body 61, a tube member 62 protruded in an L shape from the upper center portion of the cover main body 61, and a flange 63 formed around the lower portion of the cover main body 61. These elements 61, 62, and 63 are integrated to complete the cover 60. The lower inner circumference of the cover main body 61 defines a cover fitting element 61a, which holds the flange 32a of the casing main body 30 fitted therein. The tube member 62 has an inner cover passage 62a, which has one end connected to the first connection conduit 32b of the casing main body 30 and the other end connected to the canister (not shown). The flange 63 has an annular weld portion 63a on its lower end. The cover 60 is made of polyethylene having excellent fuel oil resistance, and is welded to the tank upper wall FTa of the polyethylene fuel tank FT via the annular weld portion 63a.

Figure 3:
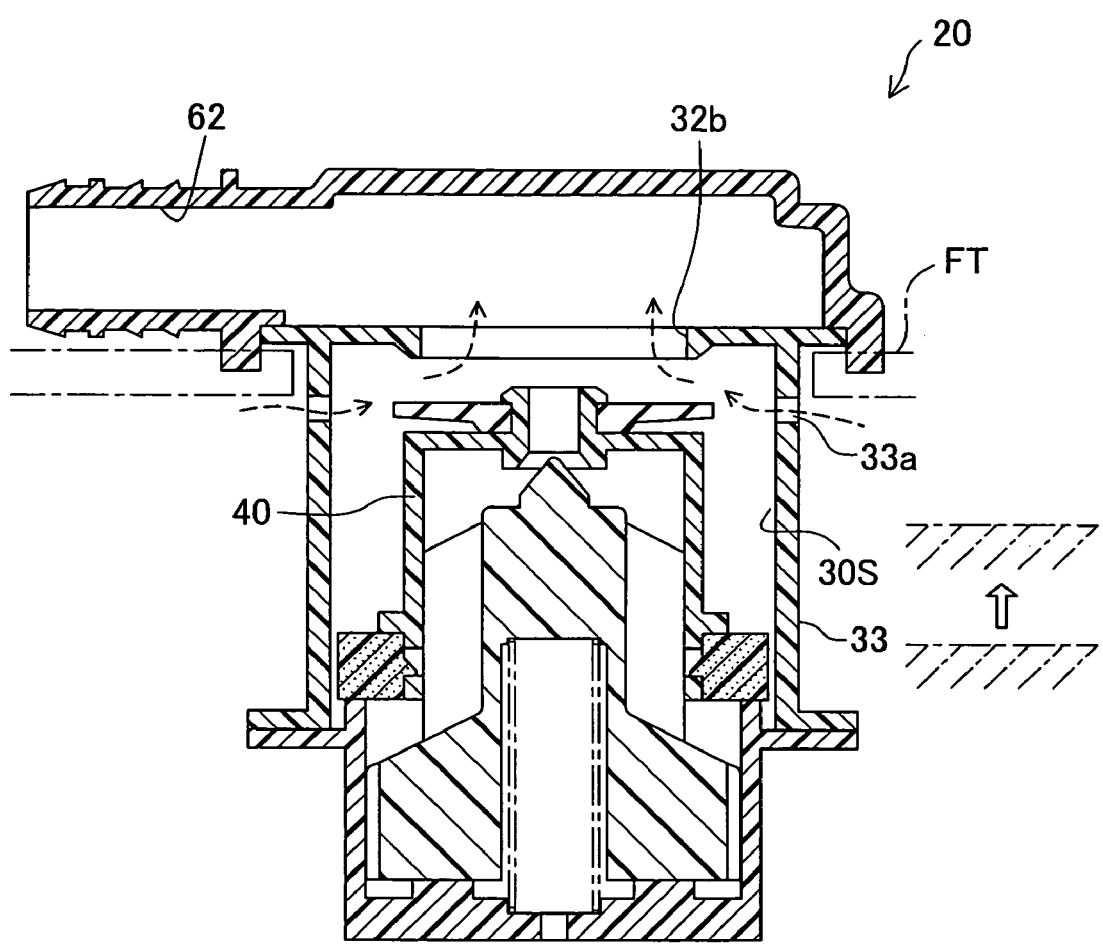
FIG. 3 shows the state of the fuel cutoff valve at the time of fuel supply.

(3) Operations of Fuel Cutoff Valve 20 in the Course of Fuel Feed (3)-1 Fuel Feed Operations The following description regards the operations of the fuel cutoff valve 20. A fuel supply is fed from a fuel feed gun (not shown) to the fuel tank FT, while the fuel cutoff valve 20 is in its open position shown in FIG. 3. With a rise of the liquid level in the fuel tank FT, the fuel vapor remaining in the upper space of the fuel tank FT is flown through the first connection hole 33a of the side wall 33, the valve chamber 30S, the first connection conduit 32b, and the cover passage 62a and is released to the canister. Since the first connection hole 33a is located at substantially the same height as the top face of the first float 40 in the open position of the fuel cutoff valve 20 shown in FIG. 3, the air current flown through the first connection conduit 32b does not work to lift up the first float 40 to its closing position.

Figure 4:
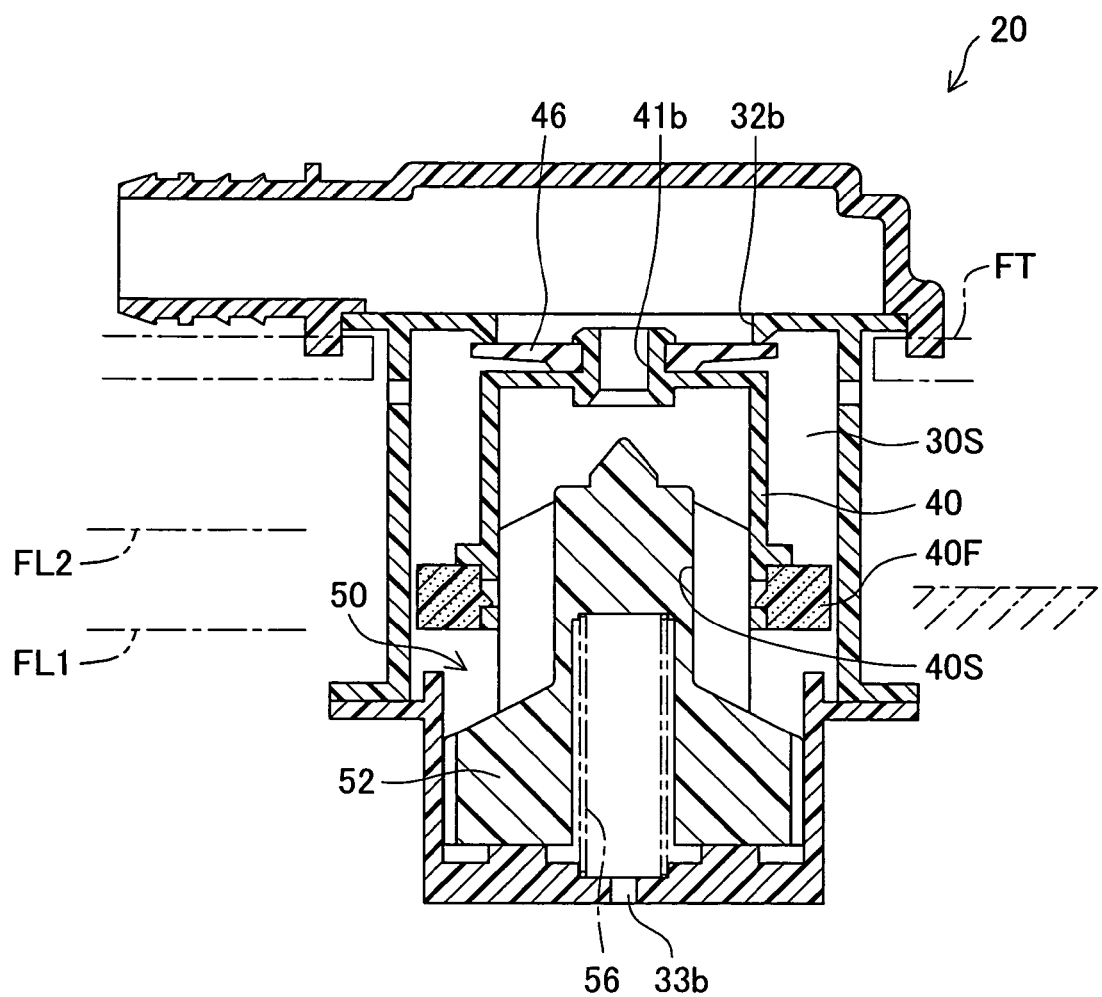
FIG. 4 shows the operations of the fuel cutoff valve when the liquid level exceeds a preset first liquid level.

As shown in FIG. 4, with the rise of the liquid level in the fuel tank FT, the liquid fuel flows through the second connection hole 35b into the valve chamber 30S to enhance the buoyancy of the first float 40. When the liquid level exceeds the preset first liquid level FL1, the first float 40 moves up to make the rubber valve body 46 close the first connection conduit 32b. The blockage of the first connection conduit 32b raises the inner pressure of the fuel tank FT. The fuel feed gun detects this pressure rise and stops the fuel supply. In this manner, the fuel cutoff valve 20 functions to release the fuel vapor from the fuel tank FT, while preventing the liquid fuel from being flown out of the fuel tank FT, in the course of fuel feed to the fuel tank FT.

In this state, the second float 52 of the rollover valve 50 does not move up but keeps the second connection conduit 41b open, since the resulting upward force of the buoyancy and the spring 56 does not exceed the weight of the second float 52. The fuel tank FT is thus connected to the canister via the first connection hole 33a, the storage chamber 40S, and the second connection conduit 41b.

Figure 5:
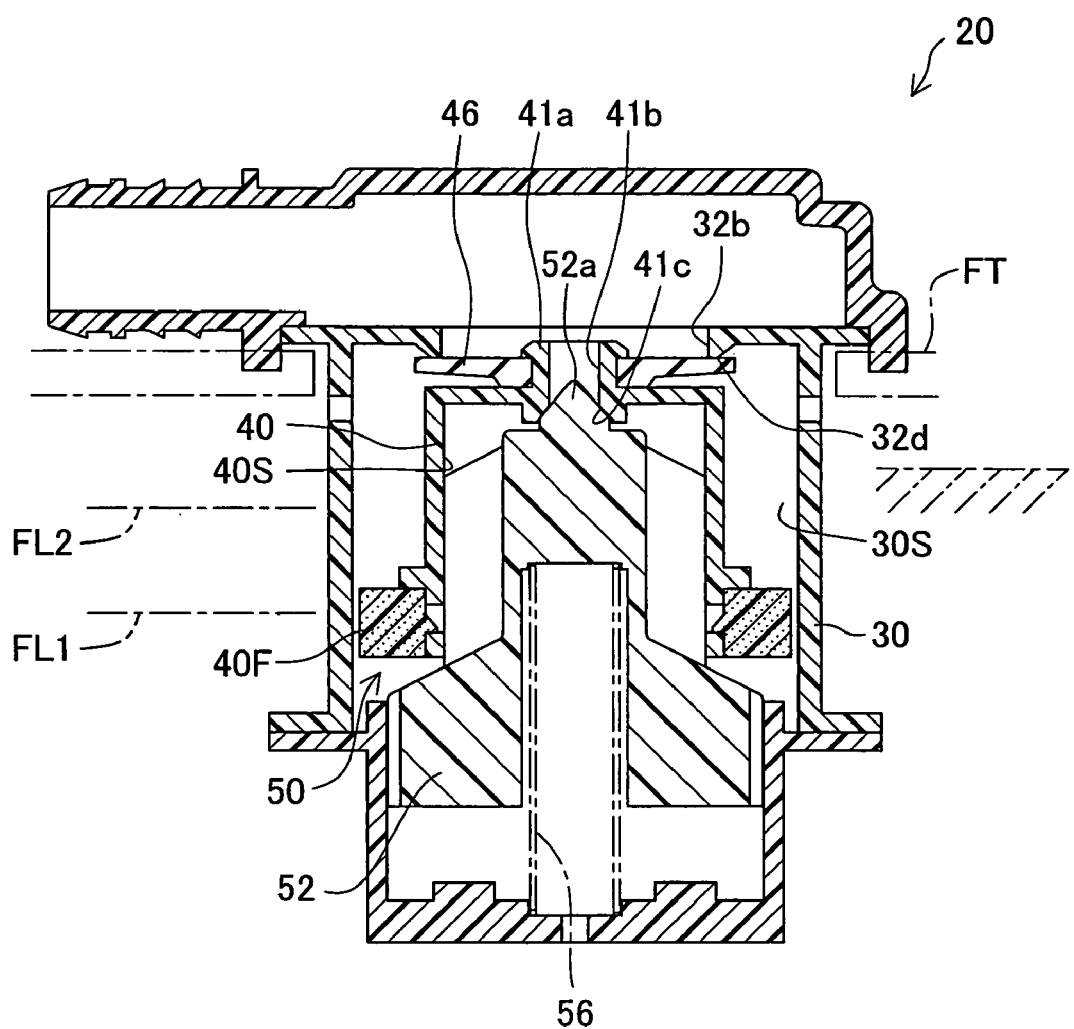
FIG. 5 shows the operations of the fuel cutoff valve when the liquid level exceeds a preset second liquid level.

As the fuel supply continues from the fuel supply gun, the liquid level in the fuel tank FT rises to the preset second liquid level FL2 as shown in FIG. 5. The fuel flown into the lower portion of the valve chamber 30S moves the second float 52 up and causes the seal projection 52a to be seated on the seat surface 41c of the connection pipe 41a and close the second connection conduit 41b. In this manner, the rollover valve 50 functions to close the second connection conduit 41b and prevent the outflow of fuel to the canister, when the liquid level in the fuel tank FT reaches the second liquid level FL2, which is higher than the first liquid level FL1.

When the liquid level in the fuel tank FT is lowered by consumption of the liquid fuel or recovery of the vehicle attitude from a tilt, the second float 52 decreases its buoyancy and moves down to open the second connection conduit 41b (returning from the state of FIG. 5 to the state of FIG. 4). The second float 52 quickly goes down to open the second connection conduit 41b, because of the relatively large weight of the second float 52 and the small contact area between the seal projection 52a and the seat surface 41c. The opening of the second connection conduit 41b causes the inner pressure of the storage chamber 40S to be approximate to the ambient pressure of the first connection conduit 32b via the second connection conduit 41b. The small pressure difference decreases the adhesive force of the rubber valve body 46 to the first seat 32d and makes the first float 40 smoothly go down to the position of FIG. 3. The second float 52 functions as the rollover valve 50, and assures the favorable valve re-opening operation to smoothly move down the first float 40 to its open position.

(3)-2 Operations of Fuel Cutoff Valve 20 in Vehicle Rocking Attitude

The buoyancy body 40F decreases the resulting specific gravity of the first float 40 to be in the range of 0.5 to 0.7. When a rock of the vehicle fluctuates the liquid level in the fuel tank FT, which is close to the first liquid level FL1, the first float 40 is susceptible to the buoyancy, while being exposed to only a small frictional force caused by the pressing force against the inner wall of the casing main body 30. The first float 40 thus quickly moves up to close the first connection conduit 32b. This arrangement effectively prevents leakage of the fuel in the vehicle rocking attitude.

(3)-3 Operations of Fuel Cutoff Valve 20 in Vehicle Rolling Attitude

Figure 6:
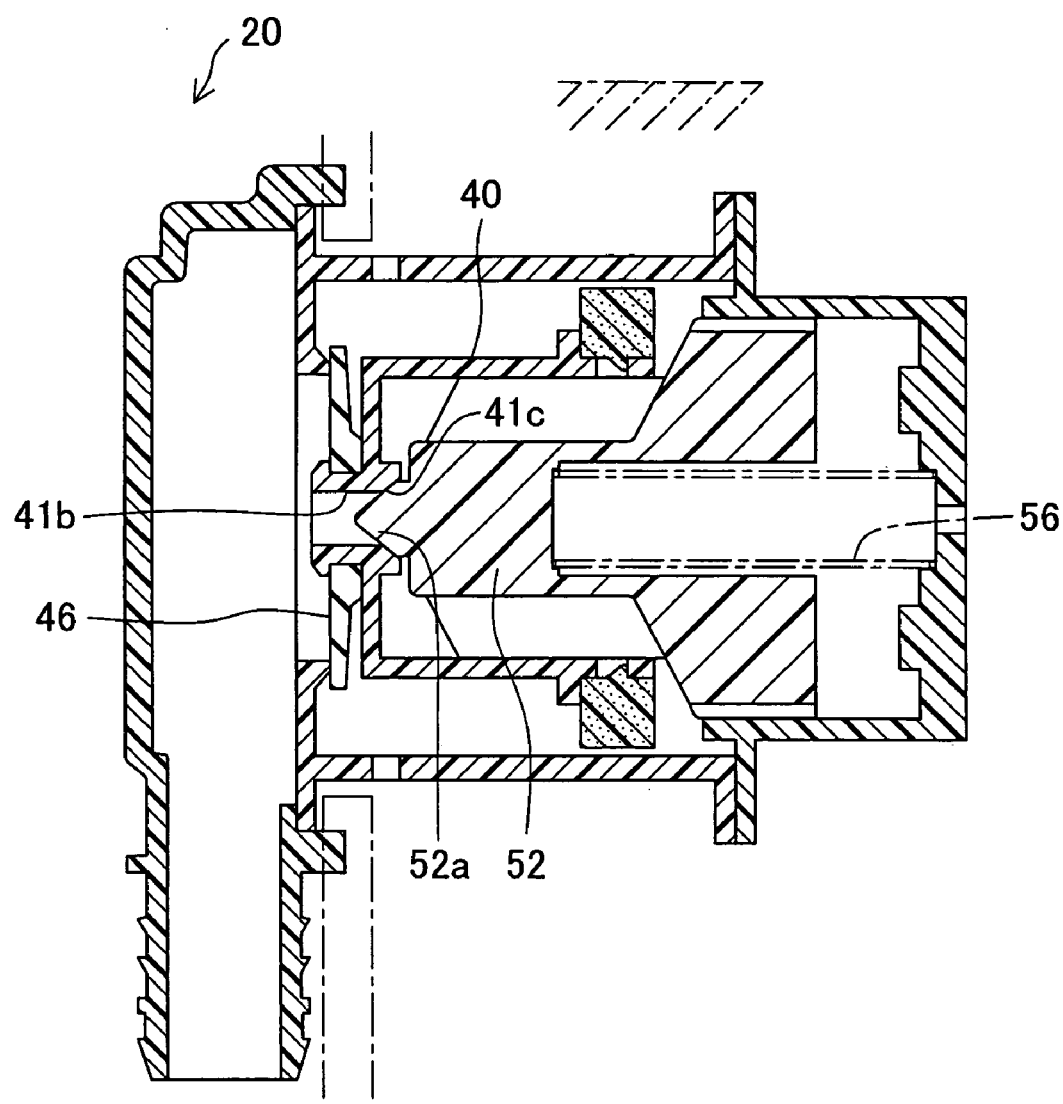
FIG. 6 shows the operations of the fuel cutoff valve in a vehicle rolling attitude.

When a roll of the vehicle causes the fuel cutoff valve 20 to be soaked in a latent attitude in the liquid fuel as shown in FIG. 6, the second float 52 gains the buoyancy and moves leftward (in the drawing) by the pressing force of the spring 56, while pressing the first float 40 to move in the same direction. The seal projection 52a of the second float 52 is then seated on the seat surface 41c to close the second connection conduit 41b. This arrangement effectively prevents leakage of the fuel in the vehicle rolling attitude.

(3)-4 Operations of Fuel Cutoff Valve 20 in Vehicle Turnover Attitude

Figure 7:
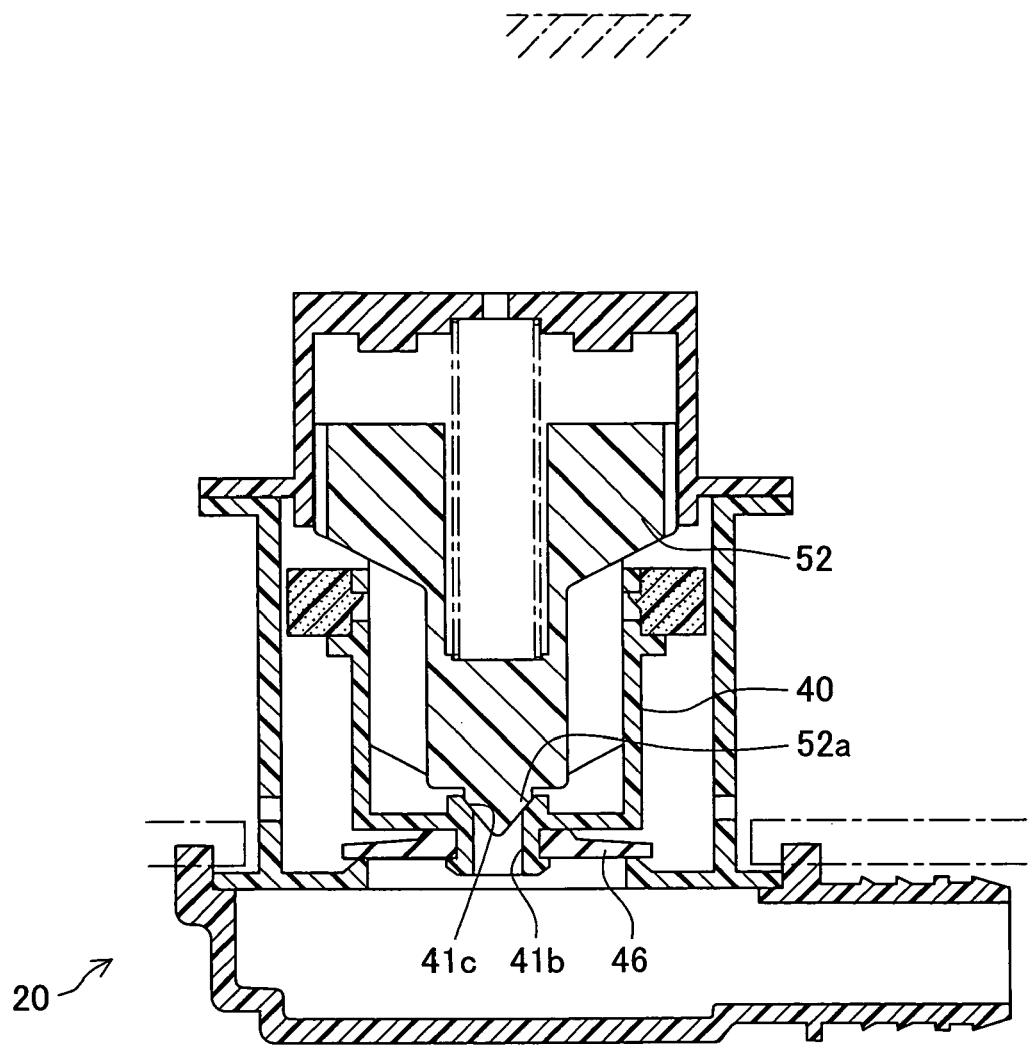
FIG. 7 shows the operations of the fuel cutoff valve in a vehicle turnover attitude.

When a turnover of the vehicle causes the fuel cutoff valve 20 to be soaked in an inverse attitude in the liquid fuel as shown in FIG. 7, the second float 52 having the greater specific gravity than that of the fuel sinks and presses the first float 40 down. The seal projection 52a of the second float 52 is then seated on the seat surface 41c to close the second connection conduit 41b. This arrangement effectively prevents leakage of the fuel in the vehicle turnover attitude.

(4) Functions and Effects of Fuel Cutoff Valve 20

The fuel cutoff valve 20 of the embodiment has diverse functions and effects, in addition to those discussed above.

(4)-1 Since the buoyancy body 40F makes the resulting specific gravity of the first float 40 significantly smaller than the specific gravity of the fuel, in the case of an abrupt rise of the liquid level in the fuel tank FT, for example, in the state of liquid level fluctuation during a turn of the vehicle, the movement of the first float 40 well follows the rise speed of the liquid level and quickly blocks the first connection conduit 32b.

(4)-2 Since the second float 52 has the greater specific gravity than that of the fuel and is not exposed to a negative pressure in the storage chamber 40S, the second float 52 is thus immediately separated from the first float 40 when the liquid level becomes lower the second liquid level FL2. This quickly cancels the pressure difference between the inside and the outside of the fuel tank FT. This arrangement effectively prevents the lightweight first float 40 from adhering to the first seat 32d and ensures the excellent valve re-opening properties.

(4)-3 In the vehicle rolling attitude and the vehicle turnover attitude, the second float 52 having the large specific gravity presses against and sinks the first float 40 to block both the first connection conduit 32b and the second connection conduit 41b. This arrangement effectively prevents leakage of the fuel from the fuel tank FT.

(4)-4 The float main body 40M of the first float 40 is composed of a conventionally used hard resin, which ensures the high accuracy of sealing and the sufficiently high mechanical strength against a large external force applied, for example, at the time of a vehicle turnover.

(4)-5 The first liquid level FL1 as the criterion of making the first float 40 close the first connection conduit 32b is adjustable by regulating the height and the specific gravity of the buoyancy body 40F. This structure does not require any subtle or troublesome adjustment of the load of the spring 56 or the shape of the first float 40.

(5) The embodiment discussed above is to be considered in all aspects as illustrative and not restrictive. There may be many modifications, changes, and alterations without departing from the scope or spirit of the main characteristics of the present invention. Some examples of possible modification are given below.

Figure 8:
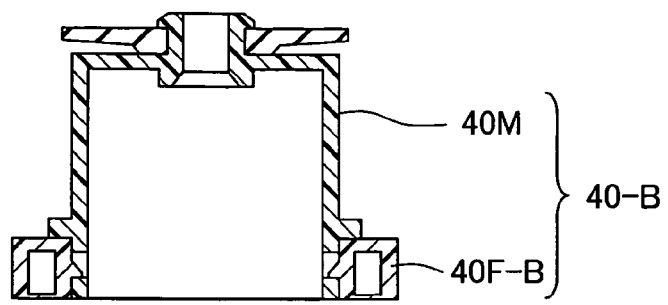
FIG. 8 is a cross sectional view illustrating a first float of an modified embodiment of the prevent invention.

(5)-1 In the above embodiment, the buoyancy body 40F is a foamed member. This is, however, not restrictive at all. FIG. 8 is a sectional view illustrating a first float 40-B of another embodiment of the prevent invention. In FIG. 8, the buoyancy body 40F-B is formed as a hollow member by taking into account the crashproof in the event of a turnover of the vehicle.

Figure 9:
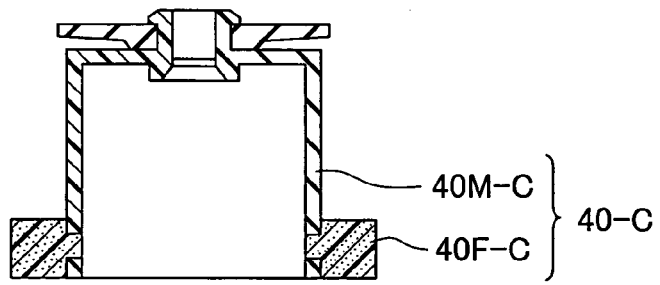
FIG. 9 is a sectional view illustrating a first float of another modified embodiment of the prevent invention.

(5)-2 In the structure of the above embodiment, the buoyancy body 40F is coupled with the float main body 40M via the claw fit in the hole. As shown in FIG. 9 illustrating a first float 40-C, the buoyancy body 40F-C and the float main body 40M-C may be formed integrally, for example, by two color molding.

Figure 10:
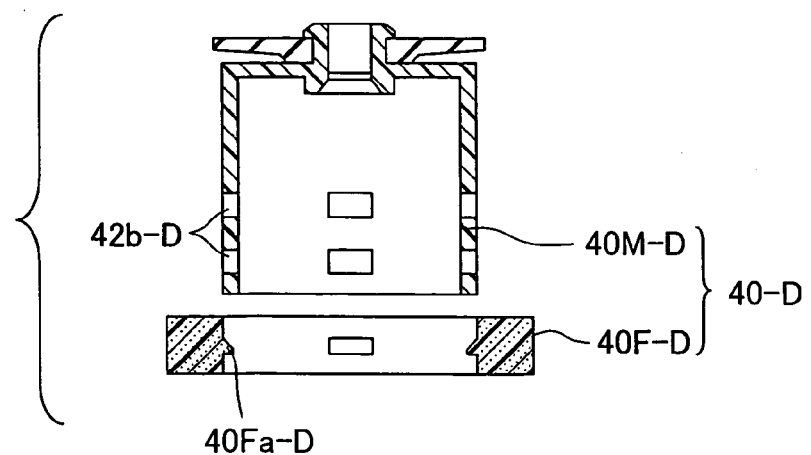
FIG. 10 is a decomposed sectional view illustrating a first float of another embodiment of the present invention.

(5)-3 The first float may have multiple attachment elements arranged along its height for attachment of the buoyancy body. As shown in FIG. 10 illustrating a first float 40-D, attachment holes 42b-D are formed on a float main body 40M-D. Each of the attachment holes 42b-D can be selectively engaged with an engagement projection 40Fa-D. Thus, the attachment position of the buoyancy body 40F-D can be selected appropriately according to the shape of the fuel tank.

(5)-4 In the above embodiment, the structure of the second float 52 is applied to the rollover valve to prevent leakage of the fuel in the vehicle rolling attitude or in the vehicle turnover attitude. The structure of the second float may alternatively be applied to an excess feed check valve to set the full level of fuel supply to the second liquid level and thereby prevent an excess fuel supply.

The scope and spirit of the present invention are indicated by the appended claims, rather than by the foregoing description.

What is claimed is:

1. A fuel cutoff valve that is attached to an upper wall of a fuel tank, and works by a liquid level in the fuel tank, the fuel cutoff valve comprising:
   a casing including (i) a casing main body having a valve chamber connected to the fuel tank, (ii) an external conduit located outside the fuel tank, and (iii) a first connection conduit formed in an upper portion of the casing main body to connect the external conduit with the valve chamber,
   a first float including (i) a float main body accommodated in the valve chamber, being capable of moving up and down, the float main body having (i-a) a bottom-open storage chamber, and (i-b) a second connection conduit to connect the first connection conduit and the storage chamber, an area of the second connection conduit being smaller than that of the first connection conduit, and (iii) a buoyancy body coupled with the float main body and making a resulting specific gravity of the buoyancy body and the float main body smaller than a specific gravity of a fuel;
   a second float accommodated in the storage chamber, being capable of moving up and down according the liquid level in the fuel tank to open and close the second connection conduit, a specific gravity of the second float being greater than that of the fuel, and;
   a spring for pressing the second float toward the second connection conduit,
   wherein the first float is constructed to move up by buoyancy and thereby close the first connection conduit when the liquid lever exceeds a first liquid level, and
   the second float is constructed to move up by buoyancy and a pressing force of the spring and thereby close the second connection conduit when the liquid level exceeds a second liquid level higher than the first liquid level, and to move down to open the second connection conduit when the level drops below the second liquid level but is still above the first liquid level.

2. The fuel cutoff valve in accordance with claim 1, wherein the buoyancy body includes a closed-cell foamed member made of a resin material with great fuel resistance.

3. The fuel cutoff valve in accordance with claim 2, wherein the resin material of the buoyancy body is butadiene acrylonitrile copolymer.

4. The fuel cutoff valve in accordance with claim 3, wherein the float main body and the second float are made of polyacetal.

5. The fuel cutoff valve in accordance with claim 4, wherein the float main body and the second float have a specific gravity of 1.2 to 1.4, and the buoyancy body has a specific gravity of 0.2 to 0.5, a total specific gravity of the float main body and the buoyancy body being in a range of 0.5 to 0.7.

6. The fuel cutoff valve in accordance with claim 1, wherein the float main body and the second float have a specific gravity of 1.2 to 1.4, and the buoyancy body has a specific gravity of 0.2 to 0.5, a total specific gravity of the float main body and the buoyancy body being in a range of 0.5 to 0.7.

7. The fuel cutoff valve in accordance with claim 1, wherein the buoyancy body includes a ring-shaped body surrounding an outer circumference of the float main body, the ring-shaped body attached to the float main body via an attachment mechanism.

8. The fuel cutoff valve in accordance with claim 7, wherein the attachment mechanism includes a attachment hole formed on a side wall of the float main body and an attachment projection formed on an inner wall of the ring-shaped body, the attachment projection engaging with the attachment hole.

9. The fuel cutoff valve in accordance with claim 8, wherein attachment mechanism is configured such that the buoyancy body is attached changeably to a lower portion of the float main body along a vertical axis of the float main body.

10. The fuel cutoff valve in accordance with claim 1, wherein the buoyancy body is a hollow member.

11. The fuel cutoff valve in accordance with claim 1, wherein the buoyancy body is made of a resin material different from that of the float main body, and formed integrally with the float main body.

12. The fuel cutoff valve in accordance with claim 1, wherein the casing main body includes a cylindrical side wall forming the valve chamber and a connection hole formed in the side wall and connecting the fuel tank and the valve chamber, the connection hole being constructed to be located above an top surface of the first float set in a lower position.

* * * * *